United States Patent [19]

Engström et al.

[11] Patent Number: 5,093,097
[45] Date of Patent: Mar. 3, 1992

[54] PROCESS FOR THE PRODUCTION OF CHLORINE DIOXIDE

[75] Inventors: Jörgen Engström, Bergeforsen; Birgitta Sundblad, Sundsvall, both of Sweden

[73] Assignee: Eka Nobel AB, Surte, Sweden

[21] Appl. No.: 594,559

[22] Filed: Oct. 9, 1990

[30] Foreign Application Priority Data

Mar. 16, 1990 [SE] Sweden .................. 9000956

[51] Int. Cl.$^5$ ............................................ C01B 11/02
[52] U.S. Cl. ..................................... 423/479; 423/478
[58] Field of Search ............................... 423/479, 478

[56] References Cited

U.S. PATENT DOCUMENTS

| | | | |
|---|---|---|---|
| 2,338,268 | 1/1944 | Stossel et al. | 423/479 |
| 2,676,089 | 4/1954 | Wagner | 423/479 |
| 3,563,702 | 2/1971 | de Vere Partridge et al. | 423/478 |
| 3,864,456 | 2/1975 | Winfield et al. | 423/478 |
| 3,933,988 | 1/1976 | Rosen | 423/480 |
| 4,225,455 | 9/1980 | Haas | 423/400 |
| 4,421,730 | 12/1983 | Isa et al. | 423/478 |
| 4,465,658 | 8/1984 | Fredette | 423/478 |
| 4,473,540 | 9/1984 | Fredette | 423/479 |
| 4,770,868 | 9/1988 | Norell | 423/479 |

OTHER PUBLICATIONS

Richter, "Textbook of Organic Chemistry", John Wiley & Sons, N.Y., 1948, pp. 78–79.

Primary Examiner—John Niebling
Assistant Examiner—Brian M. Bolam
Attorney, Agent, or Firm—Burns, Doane, Swecker & Mathis

[57] ABSTRACT

A process for the production of chlorine dioxide by reacting in a reaction vessel an alkali metal chlorate, mineral acid and a reducing agent in such proportions that chlorine dioxide is produced in a reaction medium which is maintained at a temperature of from about 50° C. to about 100° C. and at an acidity within a range of from about 2 to about 11N and which is subjected to subatmospheric pressure sufficient for evaporating water. A mixture of chlorine dioxide and water vapor is withdrawn from an evaporation zone in the reaction vessel, and alkali metal sulfate is precipitated in a crystallization zone in the reaction vessel. Straight chained alcohols with the formula $CH_2OH(CHOH)_nCH_2OH$ where n=0-5, are used as reducing agents. Preferred reducing agents consist of glycol or glycerol. The reaction may also be performed in the presence of a catalyst.

6 Claims, No Drawings

PROCESS FOR THE PRODUCTION OF CHLORINE DIOXIDE

The present invention relates to a process for the production of chlorine dioxide from an alkali metal chlorate, a mineral acid and a reducing agent. The process is carried out in a vessel operated under subatmospheric pressure, water being evaporated and withdrawn together with chlorine dioxide, and the alkali metal salt of the mineral acid being crystallized in the reaction vessel and withdrawn therefrom. According to the invention certain multifunctional alcohols are used as a reducing agent.

Chlorine dioxide used in aqueous solution is of a considerable commercial interest, mainly in pulp bleaching, but also in water purification, fat bleaching, removal of phenols from industrial wastes etc. It is therefore desirable to provide processes in which chlorine dioxide can be efficiently produced.

In existing processes for the production of $ClO_2$ chlorine gas is often formed as a by-product, due to the use of chloride ions as reducing agent. The basic chemical reaction involved in such processes can be summarized by the formula $$ClO_3^- + Cl^- + 2H^+ \rightarrow ClO_2 + \tfrac{1}{2}Cl_2 + H_2O \qquad [1]$$

The chlorate ions are provided by alkali metal chlorate, preferably sodium chlorate, the chloride ions by alkali metal chloride, preferably sodium chloride, or by hydrogen chloride, and the hydrogen ions are provided by mineral acids, generally sulfuric acid and/or hydrochloric acid.

The formed chlorine gas by-product has previously been used as such in paper mills as bleaching agent in aqueous solution. Today, there is a tendency in industry towards a more extensive chlorine dioxide bleaching for environmental reasons and, thus, there is less need for chlorine as a bleaching agent.

Methods for the preparation of chlorine dioxide are described in for example U.S. Pat. Nos. 3,563,702 and 3,864,456.

It is also known to use other reducing agents which do not produce chlorine as a by-product. In the U.S. Pat. No. 3,933,988 sulphur dioxide is used as a reducing agent and in the U.S. Pat. Nos. 4,465,658 and 4,473,540 methanol is used as a reducing agent. In a process according to e.g. U.S. Pat. No. 4,465,658, only a very small amount of the methanol is utilized. The consumption of methanol is 190–200 kg per ton chlorine dioxide produced, while the theoretically estimated consumption only is 79 kg per ton according to the formula $$6NaClO_3 + CH_3OH + 4H_2SO_4 \rightarrow 6ClO_2 + CO_2 + 5H_2O + 2Na_3H(SO_4)_2 \qquad [2]$$

Thus, according to the known process, only about 40% of the added methanol is used effectively.

However, the direct reaction between chlorate ions and methanol is very slow, and the direct reducing agent in this case is chloride ions reacting according to [1]. The chlorine formed then reacts with methanol to regenerate chloride ions according to the formula $$CH_3OH + 3Cl_2 + H_2O \rightarrow 6Cl^- + CO_2 + 6H^+ \qquad [3]$$

It is therefore often necessary to continuously add a small amount of chloride ions in order to obtain a steady production.

Several processes have been developed to render the utilization of methanol more effective. U.S. Pat. No. 4,770,868 discloses an improved method of adding the methanol in which the yield is increased. In SE patent application 8803761-9 catalysts are used to improve the efficiency of the process.

Attempts to find other usable reducing agents have also been made. Instead of methanol, other alcohols, such as ethanol and propanol, have been suggested. However, in experiments with ethanol and propanol the production rate was not sufficient and was not enough for an efficient chlorine dioxide process.

However, it was surprisingly found that chlorine dioxide could be produced with a high yield and a good production rate using certain multifunctional alcohols as reducing agents. It appeared that when using straight chained alcohols with the formula $CH_2OH(CHOH)_nCH_2OH$ where $n=0-5$ as reducing agent, the chlorine dioxide production was as good as or better than when methanol was used as reducing agent. The group of alcohols mentioned includes, besides glycol and glycerol, also so called sugar alcohols. Sugar alcohols refer to straight chained alcohols with the formula $CH_2OH(CHOH)_nCH_2OH$ where $n=2-5$. It is a preferred embodiment of the invention to use the two lowest alcohols, i.e. glycol and glycerol.

Without being bound to any specific theory, it is assumed that the straight chained multifunctional alcohols, in contrast to alkyl alcohols, give satisfactory results as reducing agents due to the fact that the multi functional alcohols may be considered as molecules with repeating methanol groups. Therefore, in the reaction medium, the multifunctional alcohols might be decomposed into methanol groups and work as an indirect reducing agent according to formula [3].

The new reducing agents have several advantages. They do not give any chlorine gas as by-product. Further, they are not volatile as for example methanol, so they do not evaporate when the reaction medium is boiled in the reactor. Since no reducing agent disappears through evaporation, only a minor excess of the reducing agent has to be added compared to the case when methanol is used as reducing agent. The smallest theoretically estimated amount of reducing agent to be added is given by the formula:

$$(30 + 12n) NaClO_3 + 3 CH_2OH(CHOH)_nCH_2OH +$$
$$(20 + 8n) H_2SO_4 \longrightarrow (30 + 12n) ClO_2 +$$
$$(6 + 3n) CO_2 + (10 + 4n) Na_3H(SO_4)_2 + (24 + 9n)H_2O$$

where $n=0-5$ as above.

Suitable amounts of the reducing agent to be added are 0.10–0.50 kg/kg chlorine dioxide, preferably 0.15–0.25 kg/kg chlorine dioxide.

The production of chlorine dioxide according to the present process is performed in a single reaction vessel, generator - evaporator - crystallizer. A suitable reactor is an SVP$^{(R)}$ (single vessel process) reactor. The reactants are continuously added to the reactor. The alkali metal chlorate is added in an amount of from 1.58 to 2.0 tons per ton chlorine dioxide. The reaction is suitably operated at a temperature of 50°–100° C., preferably 50°–75° C. and at a pressure below atmospheric pressure, suitably at 60–400 mm Hg. The reaction medium is then boiling or water is evaporated in a sufficient amount for diluting the chlorine dioxide produced to a safe concentration. The acid strength in the reactor is adjusted by adding sulfuric acid or another mineral acid. In the reactor, the alkali metal salt of the mineral acid is continuously crystallized and separated in a suitable manner. The process is not restricted to any of the alkali metals, but sodium is the most preferred.

The acid strength of the reaction medium may be held within a wide range, suitably within the range 2-11N. At a lower acidity, between about 2 and about 4.8, neutral alkali metal sulphate is formed, which is an advantage, e.g. from a corrosive point of view, but in the mean time the chlorine dioxide reaction is slower than it is at higher acidities. It is known to use catalysts to increase the reaction rate, especially when the acidity is low. The same catalysts as those used together with methanol in SE patent application 8803761-9 may be used in the present process. The catalysts consist of one or a combination of two or more metals selected from the group: antimony, molybdenum, technetium, ruthenium, rhodium, palladium, rhenium, osmium, iridium or platinum, or a combination of one or more of those with manganese or vanadium. The catalysts are used in the form of soluble salts or complexes, such as for example chlorides and sulphates. They are added in such an amount that the concentration in the reactor solution becomes 0.001 to 10 mM, preferably 0.1 to 5mM.

To avoid losses of product when starting or changing the production, it may be suitable to add small amounts of chloride ions, preferably in the form of sodium chloride, so the concentration of those in the reactor is within the range from 0.001 and up to 0.8 moles per liter. Normally such amounts appear in technical chlorate.

The invention will now be illustrated by the following examples where parts and percentages relate to parts by weight and per cent by weight, unless otherwise stated.

EXAMPLE 1

To a chlorine dioxide reactor 250 g/h NaClO$_3$ in aqueous solution and 128 g/h 10% ethylene glycol solution were added. 50% H$_2$SO$_4$ was added to maintain an acidity of 6.5N. With the chlorate solution also 3 g/h NaCl was added. The reactor operated continuously at a temperature of 70° C. and the reaction medium was kept boiling at a pressure of 150 mm Hg, i.e. below atmospheric pressure. The chlorine dioxide production was 1.2 kg/l per day.

EXAMPLE 2

To a chlorine dioxide reactor 322 g/h NaClO$_3$ in aqueous solution and 150 g/h 20% ethylene glycol solution were added. 50% H$_2$SO$_4$ was added to maintain an acidity of 9N. With the chlorate solution 4 g/h NaCl was added. In other respects the experiment was identical with example 1. The chlorine dioxide production was 1.5 kg/l per day.

EXAMPLE 3

As reducing agent 50% glycerol was used. The experiment was performed in accordance with example 1, but the addition of chlorate was 382 g/h and the flow of reducing agent was 70 g/h. Sulfuric acid was added so that the acidity was kept at 9N. The chlorine dioxide production was 1.7 kg/l per day.

The crystals formed in the three examples above consisted of Na$_3$H(SO$_4$)$_2$.

To compare the chlorine dioxide process with reducing agents according to the present invention, the following experiments were performed using ethanol and 2-propanol respectively as the reducing agent.

EXAMPLE 4

To a chlorine dioxide reactor 311 g/h NaClO$_3$ in aqueous solution and 92.2 g 50% ethanol solution were added. The acidity was kept constant at 9N by adding H$_2$SO$_4$. With the chlorate solution 5 g/h NaCl was added. The reactor operated continuously at 70° C. and 150 mm Hg whereby the reaction medium was kept boiling. The chlorine dioxide production was 0.9 kg/l, per day. This means a production rate which is half the rate as in the processes using glycol (example 2) and glycerol (example 3) respectively.

EXAMPLE 5

As reducing agent 2-propanol was used. In other respects the experiment was performed according to example 4. 150 g/h NaClO$_3$ and 90 g/h 50% reducing agent solution were added. H$_2$SO$_4$ was added to maintain the acidity constant at 9N. The chlorine dioxide production was in this case only 0.7 kg/l, per day, which is half as much as in the processes using glycol (example 2) and glycerol (example 3) respectively.

EXAMPLE 6

To a chlorine dioxide reactor 330 g/h NaClO$_3$ in aqueous solution and 60.5 g 50% ethylene glycol solution were added. 50% H$_2$SO$_4$ was added to maintain an acidity of 6N. With the chlorate solution also 4 g/h NaCl was added. The reactor operated continuously at a temperature of 70° C. and the reaction medium was kept boiling at a pressure of 150 mm Hg. The chlorine dioxide production was 1.5 kg/l per day. Then PdSO$_4$ and MnSO$_4 \times$H$_2$O were added to obtain a concentration of 0.8 mM in the reactor solution. The production immediately increased to 1.7 kg/l, per day.

We claim:

1. In a process for the production of chlorine dioxide by reacting in a reaction vessel an alkali metal chlorate, mineral acid and a reducing agent in such proportions that chlorine dioxide is produced in a reaction medium which is maintained at a temperature of from about 50° C. to about 100° C. and at an acidity within a range of from about 2 to about 11N and which is subjected to subatmospheric pressure sufficient for evaporating water, a mixture of chlorine dioxide and water vapor being withdrawn from an evaporation zone in the reaction vessel, and alkali metal sulfate being precipitated in a crystallization zone in the reaction vessel, the improvement wherein the reducing agent comprises at least one straight chained alcohol having the formula

$$CH_2OH(CHOH)_nCH_2OH$$

where n is 0 to 5.

2. A process as claimed in claim 1, wherein the reducing agent is glycol or glycerol.

3. A process as claimed in claim 1, wherein the reaction is performed in the presence of a catalyst selected from the group consisting of antimony, molybdenum, technetium, ruthenium, rhodium, palladium, rhenium, osmium, iridium, platinum, a mixture of two or more of the above, and a mixture of one or more of the above with manganese or vanadium.

4. A process as claimed in claim 1, wherein the reducing agent in said reaction vessel is present in a minor excess over a stoichiometric amount based on the hydroxyl functionality of the reducing agent.

5. A process as claimed in claim 1, wherein the mixture withdrawn from the reaction zone is substantially free of said reducing agent.

6. A process as claimed in claim 1, wherein the mixture withdrawn from the reaction zone is substantially free of chlorine gas by-product.

* * * * *